Aug. 19, 1924.

H. N. OTT 1,505,418

MICROSCOPE SUBSTAGE

Filed May 25, 1923

INVENTOR.
Harvey N. Ott,
by Parker & Prockner
ATTORNEYS.

Aug. 19, 1924.
H. N. OTT
1,505,418
MICROSCOPE SUBSTAGE
Filed May 25, 1923    3 Sheets-Sheet 2
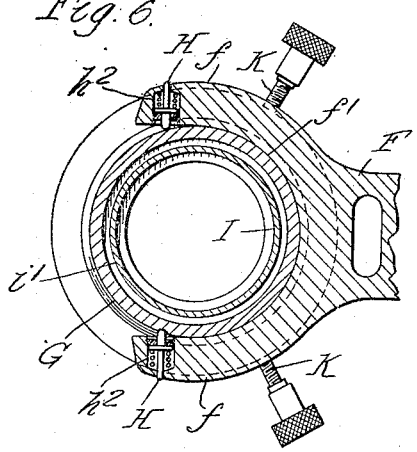
Fig. 6.
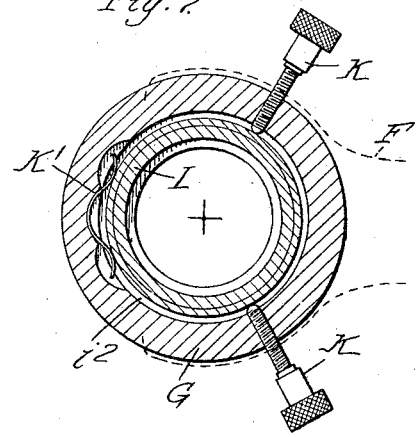
Fig. 7.
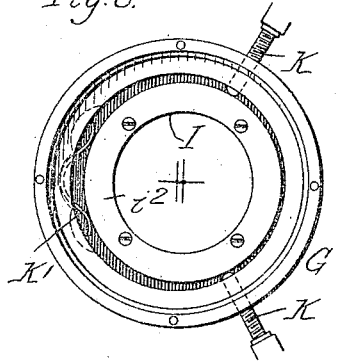
Fig. 8.
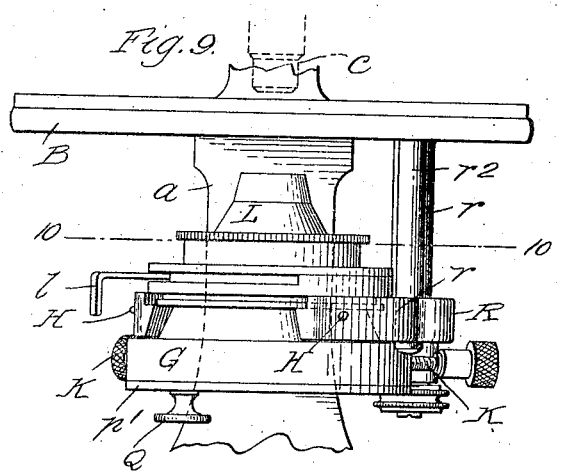
Fig. 9.
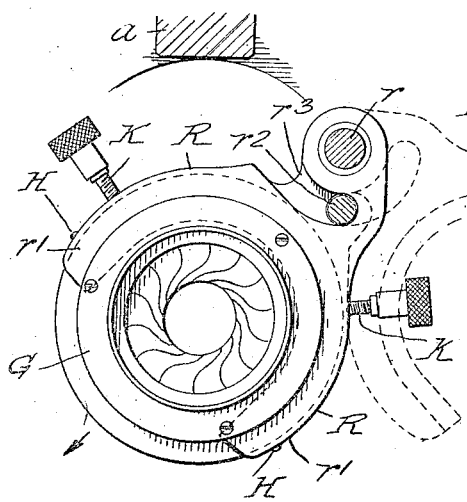
Fig. 10.
Fig. 11.
INVENTOR.
Harvey N. Ott
by Parker & Mockmore
ATTORNEYS.

Aug. 19, 1924.  
H. N. OTT  
MICROSCOPE SUBSTAGE  
Filed May 25, 1923  
1,505,418  
3 Sheets-Sheet 3

INVENTOR.  
Harvey N. Ott  
by Parker & Prochus,  
ATTORNEYS.

Patented Aug. 19, 1924.

1,505,418

UNITED STATES PATENT OFFICE.

HARVEY N. OTT, OF BUFFALO, NEW YORK, ASSIGNOR TO SPENCER LENS CO., OF BUFFALO, NEW YORK.

MICROSCOPE SUBSTAGE.

Application filed May 25, 1923. Serial No. 641,423.

*To all whom it may concern:*

Be it known that I, HARVEY N. OTT, a citizen of the United States, residing at Buffalo, in the county of Erie and State of New York, have invented a new and useful Improvement in Microscope Substages, of which the following is a specification.

This invention relates to improvements in substages of microscopes.

Microscopes have heretofore been commonly provided with substages that are adapted to swing laterally out of their operative positions under the stages of microscopes, or they are movable downwardly, to permit substage parts, such as condensers, diaphragm housings, or the like, to be moved into or out of engagement with other substage parts in the direction parallel with the optical axis of the microscopes. This type has the objection that since the substage parts must be moved into and out of their operative positions on the substage in a direction parallel with the optical axis, the necessary friction, the limited bearing surfaces and the small amount of space available under the stage of the microscope makes it difficult to maintain the alinement and to effect the necessary changes in the substage parts. The swinging type of substage is objectionable because it involves the objections stated above, and for the reason that the wear on the hinges or pivots causes the substage parts to get out of alinement with the optical axis of the instrument. In some cases, lack of space made it impossible to locate the various parts on the substage in their correct optical positions.

The objects of this invention are to provide a substage of improved construction from which the substage parts may be easily removed or replaced without requiring a lateral swinging of the substage and without excessive vertical adjustment of the substage; also to provide a substage with a forked support from which the substage parts may be readily removed or on which these parts may be placed by a lateral movement relatively to the optical axis; also to provide means for securely holding the substage parts in their correct positions on the fork of the substage; also to provide a substage which is so constructed that the iris diaphragm may be located in the correct optical position to the condenser; also to provide a substage with an intermediate supporting member on which the substage parts may be properly positioned and which may be removed from or replaced on the substage with the parts mounted thereon; also to improve the construction of substages for microscopes in other respects hereinafter specified.

Figure 3:
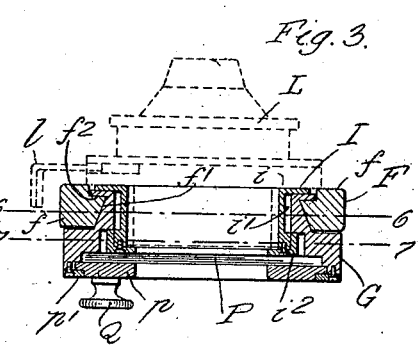
Fig. 3 is a fragmentary sectional elevation thereof on line 3—3, Fig. 2.

Figs. 6 and 7 are sectional plan views thereof on lines 6—6 and 7—7 respectively, Fig. 3.

Fig. 8 is a bottom plan view of the intermediate holder with the oblique diaphragm removed therefrom.

Fig. 9 is a fragmentary front elevation of a microscope of different construction, showing a substage construction embodying this invention applied thereto.

Fig. 10 is a top plan view thereof, partly in section, on line 10—10, Fig. 9, but with the condenser removed.

Fig. 11 is a central sectional elevation of a substage showing an adapter used thereon for using an objective lens of a microscope as a condenser in connection with the iris diaphragm.

Figure 12:
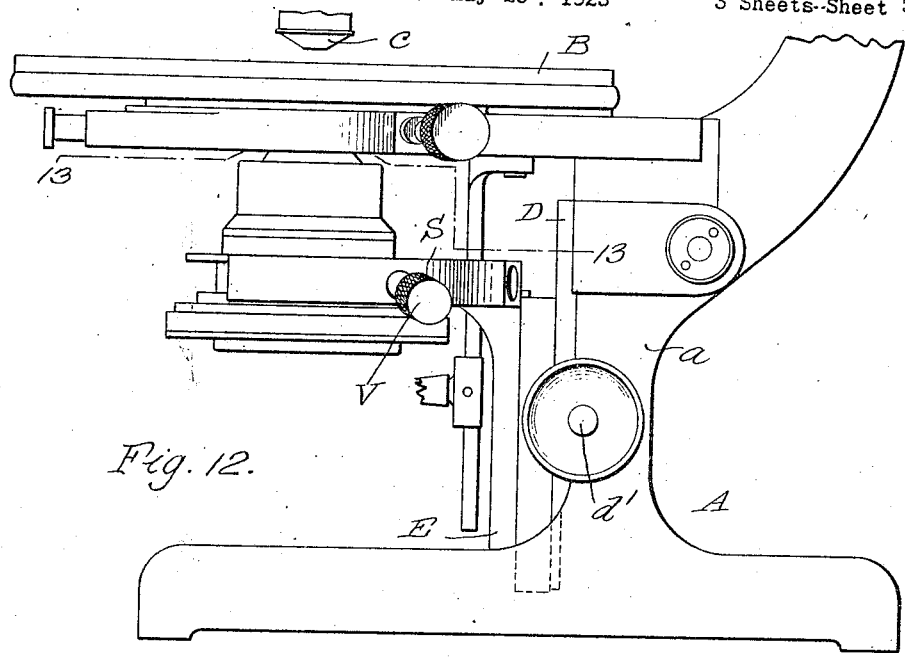

Fig. 12 is a side elevation of the lower portion of a microscope provided with a substage of modified construction.

Figures 13, 14, 15, 16, 17:
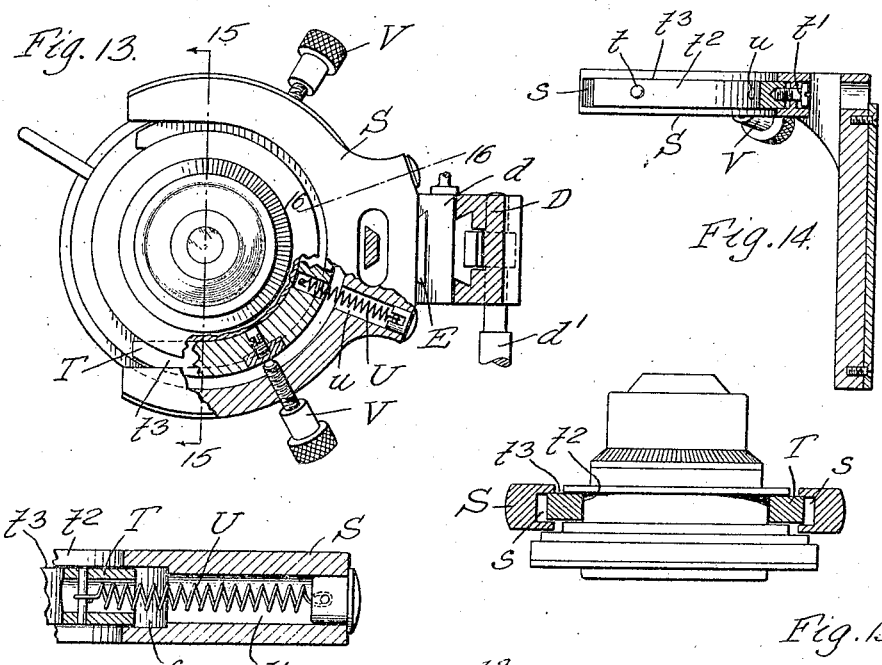

Fig. 13 is a sectional plan view thereof on line 13—13, Fig. 12.

Fig. 14 is a central sectional elevation of the forked member used in connection with the modified construction, the condenser and other substage parts being omitted.

Fig. 15 is a central sectional elevation thereof on line 15—15, Fig. 13.

Fig. 16 is a fragmentary sectional elevation thereof on an enlarged scale on line 16—16, Fig. 13.

Fig. 17 is a detailed perspective view showing a spring-pressed retaining member.

Figure 1:
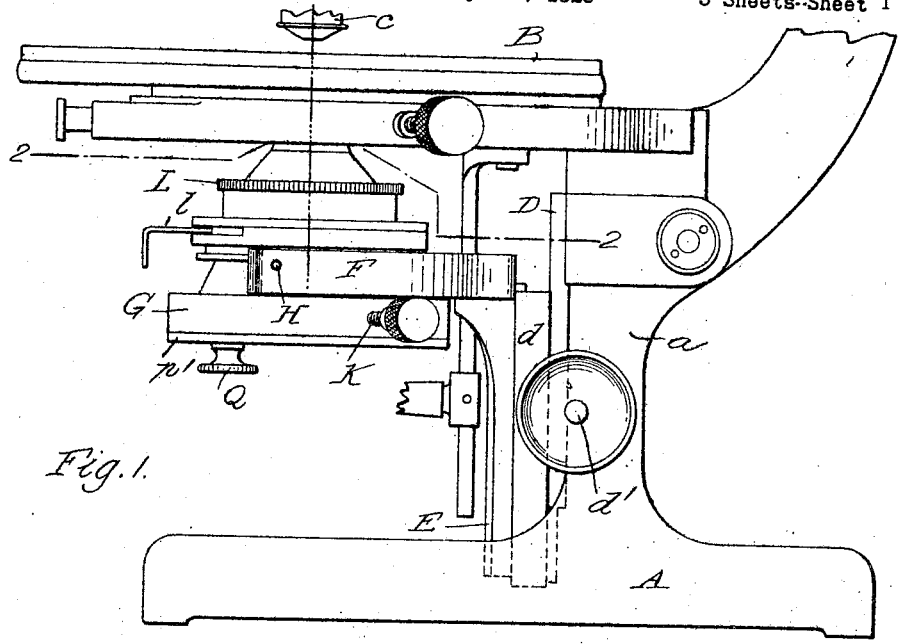
Fig. 1 is a side elevation of the lower portion of a microscope provided with a substage embodying the invention.
Figure 2:
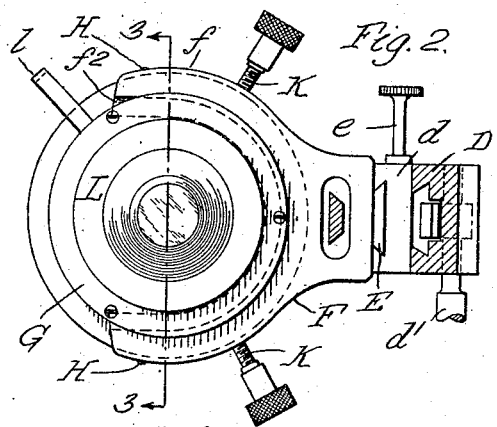
Fig. 2 is a sectional plan view thereof on line 2—2, Fig. 1.

A represents the base of a microscope having an upwardly extending arm or standard $a$ formed integral therewith and B represents the usual stage of the microscope upon which the slide or other article to be examined may be placed. The microscope itself is not shown, only the lower portion $c$ of the objective lens thereof being illustrated in Figs. 1 and 12.

The substage of the microscope may be vertically adjustable toward and from the stage B in any suitable or desired manner. In the construction shown, the adjusting means includes a fixed guide member D which is suitably secured on the upwardly extending arm $a$ of the base of the microscope and on which an intermediate or coarse adjustment slide $d$ is slidably mounted, the slide $d$ and the guide D being held in engagement in the usual manner by means of a dove-tailed connection. The intermediate slide $d$ is movable vertically relatively to the guide member by means of the usual coarse adjustment actuated by means of the usual rack and pinion (not shown), the pinion being rotatable by a shaft or pin $d'$. The intermediate slide supports a fine adjustment slide member E, which may be moved vertically by means of the fine adjustment screw $e$. All of these parts have heretofore been used in connection with substages of microscopes and of themselves constitute no part of this invention.

On the fine adjustment slide E is mounted a substage member or support F provided with guide means which extend at an angle to the optical axis and on which substage parts may be moved toward and from the optical axis of the instrument. In the particular construction shown, this support F is forked, having two arms $f$, the inner faces of which are adapted to receive other substage parts or members and preferably the arms merge into a semi-circular portion. The guide means of the vertically adjustable substage member F may be of any suitable or desired form, those shown in Figs. 1–11 including an inclined face $f'$, the end of which terminates in a substantially horizontal face $f^2$. This forked member is adapted to receive various substage parts which may be provided with guide means, corresponding with the guide means of the substage member F to enable the substage parts to be slid or moved laterally with reference to the axis of the microscope into positions in alinement with the optical axis. In the preferred construction shown in Figs. 1–11, an intermediate removable substage part is employed on which various other desired substage parts may be mounted, and which is then placed on the forked member. In the construction shown, this intermediate substage member is in the form of a supporting ring G, which, as shown, is provided with annular, outer faces corresponding with the faces $f'$ and $f^2$ of the forked member, and the curvature of the annular faces of the supporting ring is the same as that of the semi-circular portion of the forked member, so that when the supporting ring is pushed laterally between the arms of the forked member, the semi-circular portion of the forked member will engage corresponding annular faces of the ring and thus securely hold this ring in definite fixed relation to the forked member.

Figure 4:
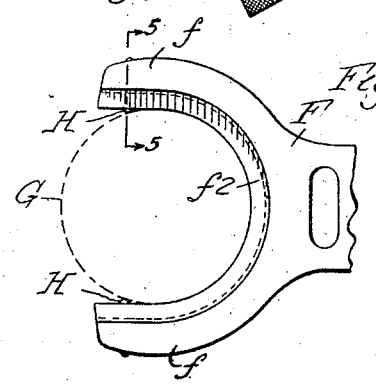
Fig. 4 is a fragmentary plan view of the forked holding member of the substage with the substage parts removed therefrom.
Figure 5:
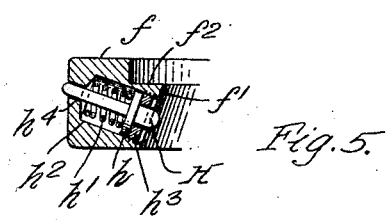
Fig. 5 is an enlarged fragmentary sectional elevation thereof on line 5—5, Fig. 4.

Means are preferably provided for holding the annular outer face of the supporting ring or other substage parts in engagement with the corresponding semi-circular face of the forked member, and for this purpose, in the construction shown, two spring pins H are provided which are arranged near the ends of the arms of the main substage support or forked member F, and which are adapted to bear against the supporting ring or other substage parts adapted to cooperate with the forked member. These spring pins may be of any suitable or desired construction, those shown being provided with a collar $h$ rigidly secured thereto and against which a coil spring $h'$ bears, the collar and coil spring being arranged in a hole $h^2$ formed in the forked member. The outer end of the hole is preferably provided with a screw thread, and a nut $h^3$ which bears against the collar $h$ holds the pin, spring and collar in proper relation in the hole. The nut is also provided with a hole through which one end of the pin passes and the other end of the pin is guided in a corresponding hole $h^4$ in the forked member. The pin is arranged at an inclination to the horizontal and bears downwardly upon the supporting ring when the same is in place, thus forcing the horizontal annular face of this ring against the horizontal semi-circular face $f^2$ of the forked member. The two pins H are arranged beyond the semi-circular portion of the forked member so that more than half of the supporting ring passes beyond the pins, as shown in Fig. 4, whereby the pins will tend to hold the supporting ring against the semi-circular inclined face $f'$ of the forked member and yieldingly resist removal thereof. It will be understood that when the supporting ring is moved past the retaining pins in either direction, these pins will be pressed inwardly by the ring against the action of the springs $h'$. Any other means for yieldingly holding the supporting ring or other substage member on the forked member of the substage may be provided, if desired.

The supporting ring is movable laterally into engagement in the forked portion of the substage and all of the various other substage parts, such as the condenser, diaphragms and the like, are carried by this supporting ring. Consequently, it is possible by a very slight axial movement of the forked member F, to make sure that all of the substage parts clear the stage B, so that the supporting ring may be placed on or removed from the forked member. By placing the various substage parts on the supporting ring while the ring is removed entirely from the substage, all the adjustments of the substage parts can be very conveniently made, and after the parts are all assembled on the supporting ring in the desired relation to each other, this ring is simply passed laterally between the two arms of the forked member and snapped in place between the spring pins. The substage parts can then be moved toward and from the stage B by means of a comparatively small movement of the adjusting devices described, whereas with devices of this kind as heretofore made, a comparatively large amount of axial movement was necessary to make it possible to move any of the substage parts axially into or out of engagement with each other or with the substage.

The supporting ring G, in the construction shown, is provided with an inner adjustable or centering ring I adapted to receive the various substage parts of the microscope and adjustable relatively to the supporting ring G for centering the condenser or other substage parts with reference to the optical axis of the microscope. In the construction shown for this purpose, the adjustable ring I is provided with a horizontal flange $i$ adapted to rest upon a corresponding horizontal face of the supporting ring G, and an outer annular face $i'$ of the adjustable ring I is spaced from the corresponding inner face of the supporting ring. Vertical movement of the adjustable ring relatively to the supporting ring is prevented by means of a flange member or collar $i^2$ secured on the adjustable ring I and engaging a horizontal lower face on the supporting ring G. The space between the horizontal cylindrical face $i''$ of the adjustable ring and the corresponding face of the supporting ring affords room for relative movement between these two rings so as to permit adjustment of the ring I. In the construction shown, this adjustment is effected by means of a pair of screws K having a threaded engagement with the supporting ring G, and the ends of which are adapted to engage the detachable flange member $i^2$ of the adjustable ring. These screws, when turned in a direction to move inwardly, move the adjustable ring against the action of a spring K' interposed between the adjustable ring I and the supporting ring G, the spring and the two screws being preferably arranged at about equal distances from each other. By means of this arrangement, the centerable ring I can be very accurately adjusted and in the case of damage, or when repairs are necessary, or if it is desired to remove the adjustable ring for cleaning or other purposes, this can be easily done while the same is removed from the forked member of the microscope. Other means for providing an adjustment of the substage parts with reference to the substage may be provided.

The inner face of the adjustable ring I is adapted to receive a condenser L or other parts which it may be desired to use in connection with a substage. The condenser shown is of the usual construction and is provided with an iris diaphragm operated by means of an arm or lever $l$. If desired, a tube M may be inserted into the inner adjustable ring, which also has an iris diaphragm $m$ controlled by means of an arm or lever $m'$. This tube M is provided at the upper end thereof with an adapter N which may be placed over the end of the diaphragm tube M and which has a central, upwardly extending collar or lug $n$ which is threaded to receive an objective lens O, whereby the objective lens may be used on the substage by merely unscrewing the same from its usual position on the microscope objective mounting and placing the same on the adapter N, which can be placed over the end of the tube M. If desired, the supporting ring G may also carry an oblique light diaphragm which of itself forms the subject matter of a separate application for patent. Briefly stated, this diaphragm includes a number of arc-shaped plates P mounted on a ring $p$, which ring in turn is rotatably mounted on the supporting ring G in any suitable manner, for example, by means of a removable flange ring $p'$. The diaphragm plates P are controlled by means of a pivoted rod having a head Q, so that by turning the head Q the plates P can be moved to any desired extent across the opening in the ring $p$, and also by means of the head Q, the ring $p$ may be turned in its bearing with the supporting ring G so that the oblique light may pass to the object from any desired angle of azimuth.

The substage construction described may be used to good advantage in connection with a "quick screw" swinging type of substage, as illustrated in Figs. 9 and 10, in which a pivoted member R adapted to swing about a vertical pin or rod $r$ is provided with a pair of arms $r'$ forming a forked member adapted to receive the supporting ring G. These parts are operated in a line parallel to the optical axis by means of a screw. The usual stop rod $r^2$ is also provided which stops the swinging of the forked member when the same is in optical alinement with the microscope, the stop rod $r^2$ when the forked member is in this position, engaging in the end of a slot $r^3$ formed therein. The forked member is provided with retaining pins for the supporting ring similar to those already described. When my improved substage is applied to microscopes of this type, it is possible to remove the substage parts by simply lowering the forked member in the usual manner and it is not necessary to swing the substage out of the optical axis of the microscope.

The substage described has the advantage that the substage parts can be easily removed from the substage with a relatively small amount of vertical movement of the substage. By providing the forked substage member with a supporting ring or member, as described, the various substage parts can be positioned on this ring while the ring is removed from the substage, which facilitates the mounting of the several parts thereon or their removal therefrom, and also makes it possible to make these parts with vertical slide bearings of increased length, thereby ensuring greater accuracy in the alinement of the parts. The construction described also makes it possible to mount the iris diaphragm on the condenser in correct optical relation to the lenses of the condenser, which has heretofore been found impractical.

In the modified form of my invention shown in Figs. 12 to 17, the substage is also provided with a forked supporting member S but in this construction the centerable member is adjustably mounted on the forked member and not on a removable substage part as in the construction hereinbefore described. The centering of the substage parts with reference to the optical axis of the microscope in this construction is effected by means of a centerable member T permanently held on the forked supporting member S. The centerable member T in turn is provided with suitable guide means, such as an open-ended slot, adapted to receive other substage parts, and near the outer end of this slot the spring-pressed retaining pins $t$ are provided which are similar in construction to the retaining pins H heretofore described. The centerable member T is adjustably held on the forked supporting member S by means of a screw $t'$ passing loosely through a hole in the main supporting member S and secured to the centerable member T, and springs U arranged in cavities or recesses $u$ in the supporting member S hold the centerable member against the heads of two adjusting screws V extending through threaded holes in the main supporting member S. The inner face of the supporting member S is provided with a channel-shaped groove $s$ in which the centerable member T is adjustably supported.

The inner face of the centerable member T is provided with an upright guide face $t^2$ which, together with the upper face $t^3$ of the centerable member are adapted to cooperate with corresponding faces of other substage parts to support the same thereon.

This construction also has the advantage that the substage parts can be removed and replaced by a lateral movement with reference to the optical axis of the instrument, thus making it possible without material addition to the cost of the microscope, to produce a substage on which the parts may be easily and quickly interchanged and in which the accurate alinement of substage parts with reference to the optical axis is less likely to be impaired than in microscopes heretofore constructed.

I claim as my invention:

1. A microscope substage including a forked member which is adjustable in a direction parallel with the optical axis of the microscope, and guide means on said forked member adapted to receive substage parts in a direction at an angle to said optical axis.

2. A microscope substage including a part adjustable in the direction of the optical axis of the microscope and having guide means extending at an angle to said optical axis, a substage part having a portion adapted to cooperate with said guide means to move toward and from said optical axis, and spring-pressed pins on said adjustable part adapted to engage said substage part and hold the same in operative relation to the microscope on said adjustable part.

3. A microscope substage including a member which is adjustable in a direction parallel with the optical axis of the microscope, a substage part adapted to be placed into operative relation to said member and removed therefrom in a direction at an angle to the optical axis of the microscope, and means for yieldingly pressing said substage part into its operative relation to the microscope.

4. A microscope substage including a member which is adjustable in a direction parallel with the optical axis of the microscope, guide means on said member including semi-circular guide faces extending at an angle to the optical axis of the microscope, and a substage part having an annular face adapted to cooperate with said semi-circular face to enable said substage part to be placed on said member and removed therefrom in a direction laterally with reference to the optical axis of the microscope.

5. A microscope substage including a forked member which is adustable in a direction parallel with the optical axis of the microscope, a substage part adapted to be inserted into said forked member and removed therefrom in a lateral direction with reference to the optical axis of the microscope, and means for resiliently holding said substage part in definite relation to said forked member.

6. A microscope substage including a member which is adjustable in a direction parallel with the optical axis of the microscope, a substage part adapted to be placed into operative relation to said member and removed therefrom in a direction at an angle to the optical axis of the microscope, means for yieldingly pressing said substage part into its operative relation to the microscope, and means for centering said substage part with reference to the optical axis of the microscope.

7. A microscope substage including a part adjustable in the direction of the optical axis of the microscope and having guide means extending at an angle to said optical axis, an intermediate supporting member having a part adapted to cooperate with said guide means to move toward and from said optical axis and having guide means extending substantially parallel to said optical axis to receive substage parts when said supporting member is removed from said adjustable part.

8. A microscope substage including a forked member which is adjustable in a direction parallel with the optical axis of the miscroscope, a supporting member adapted to be placed into operative relation to said forked member and removed therefrom in a direction at an angle to the optical axis of the microscope, and a guide surface on said member extending substantially parallel to the optical axis of the microscope and adapted to receive substage parts when said supporting member is removed from said forked member.

9. A microscope substage including a forked member which is adjustable in a direction parallel with the optical axis of the microscope, and a supporting member adapted to be placed into operative relation to said forked member and removed therefrom in a direction at an angle to the optical axis of the microscope and having a cylindrical guide surface concentric with the optical axis when said member is in its operative position on said forked member, said guide surface being adapted to receive other substage parts when said supporting member is removed from said forked member.

10. A microscope substage including a forked member which is adjustable in a direction parallel with the optical axis of the microscope, and a supporting ring adapted to be inserted into said forked member and removed therefrom in a lateral direction with reference to the optical axis of the microscope and adapted to support other substage parts.

11. A microscope substage including a forked member which is adjustable in a direction parallel with the optical axis of the microscope, a supporting ring adapted to be inserted into said forked member and removed therefrom in a lateral direction with reference to the optical axis of the microscope and adapted to support other substage parts, and spring-pressed pins arranged near the end of said forked member and adapted to bear against said supporting ring to hold the same in definite relation to said forked member.

12. A microscope substage including a forked member which is adjustable in a direction parallel with the optical axis of the microscope, and a supporting ring adapted to be placed into operative relation to said forked member and removed therefrom in a direction at an angle to the optical axis of the microscope, said supporting ring having an inner cylindrical face adapted to cooperate with corresponding faces of other substage parts for maintaining said substage parts on said ring when said ring is removed from said forked member.

13. A microscope substage including a part adjustable in the direction of the optical axis of the microscope and having guide means extending at an angle to said optical axis, an intermediate supporting member having a part adapted to cooperate with said guide means to move into and out of said optical axis, and a light-controlling diaphragm mounted on said supporting member.

14. A microscope substage including a part adjustable in the direction of the optical axis of the microscope and having guide means extending at an angle to said optical axis, an intermediate supporting member having a part adapted to cooperate with said guide means to move into and out of said optical axis, a centerable member in said supporting member adapted to receive substage parts, and means for adjusting said centerable member relatively to said supporting member to place said substage parts into alinement with the optical axis of the microscope.

15. A microscope substage including a forked member which is adjustable in a direction parallel with the optical axis of the microscope, a supporting ring adapted to be inserted into said forked member and removed therefrom in a lateral direction with reference to the optical axis of the microscope, a centerable ring arranged within said supporting ring and adapted to support other substage parts, and means on said supporting ring for adjusting said centerable ring relatively to said supporting ring.

16. A microscope substage including a part adjustable in the direction of the optical axis of the microscope and having guide means extending at an angle to said optical axis, an intermediate supporting member having a part adapted to cooperate with said guide means to move into and out of said optical axis, a light-controlling diaphragm mounted on said supporting member, a centerable ring in said supporting member adapted to receive substage parts, and means for adjusting said centerable ring relatively to said supporting member to place said substage parts into alinement with the optical axis of the microscope.

17. In a microscope, the combination of means for supporting a condenser, a tube forming a part of said condenser, and a ring having a part adapted to engage said tube and a threaded part adapted to receive an objective lens, whereby said objective lens may be used as a condenser.

18. A microscope substage including a part adjustable in the direction of the optical axis of the microscope and having guide means extending at an angle to said optical axis, an intermediate supporting member having a part adapted to cooperate with said guide means to move toward and from said optical axis, a tube adapted to be placed on said supporting member, a flanged ring adapted to be supported on said tube and having a part adapted to receive an objective lens of a microscope, whereby said objective lens may be used as a condenser.

HARVEY N. OTT.